US 9,940,244 B2

United States Patent
Quimbey et al.

(10) Patent No.: US 9,940,244 B2
(45) Date of Patent: Apr. 10, 2018

(54) SYSTEM AND METHOD FOR IMPROVED STORAGE REQUEST HANDLING IN HOST-SIDE CACHES

(71) Applicant: NETAPP, INC., Sunnyvale, CA (US)

(72) Inventors: Robert Quimbey, Sunnyvale, CA (US); John Fullbright, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 593 days.

(21) Appl. No.: 14/083,993

(22) Filed: Nov. 19, 2013

(65) Prior Publication Data
US 2015/0143053 A1    May 21, 2015

(51) Int. Cl.
*G06F 13/00* (2006.01)
*G06F 12/0888* (2016.01)
*G06F 12/0855* (2016.01)

(52) U.S. Cl.
CPC ...... *G06F 12/0888* (2013.01); *G06F 12/0855* (2013.01); *G06F 2212/311* (2013.01)

(58) Field of Classification Search
CPC .......... G06F 12/08; G06F 13/00; G06F 12/28
See application file for complete search history.

(56) References Cited

U.S. PATENT DOCUMENTS

| 6,157,963 | A * | 12/2000 | Courtright, II | G06F 3/061 710/40 |
| 8,239,589 | B1 * | 8/2012 | Certain | G06F 13/1626 710/39 |
| 9,032,165 | B1 * | 5/2015 | Brooker | G06F 12/0806 711/154 |
| 2003/0110350 | A1 * | 6/2003 | McGee | G06F 13/1642 711/108 |
| 2009/0172249 | A1 * | 7/2009 | Matthews | G06F 12/0888 711/103 |
| 2010/0268882 | A1 * | 10/2010 | Cargnoni | G06F 12/084 711/122 |
| 2012/0015630 | A1 * | 1/2012 | Ryali | H04W 4/20 455/411 |
| 2013/0290656 | A1 * | 10/2013 | Staelin | G06F 9/5083 711/158 |
| 2014/0164713 | A1 * | 6/2014 | Sim | G06F 12/0888 711/138 |

(Continued)

*Primary Examiner* — Charles Rones
*Assistant Examiner* — Han Doan
(74) *Attorney, Agent, or Firm* — Klein, O'Neill & Singh, LLP

(57) ABSTRACT

A system and method of improved storage request handling in host-side caches includes a host-side cache with a cache controller, a plurality of request queues, and a cache memory. The cache controller is configured to receive a storage request, assign a priority to the storage request based on a queuing policy, insert the storage request into a first request queue selected from the plurality of request queues based on the assigned priority, extract the storage request from the first request queue when the storage request is a next storage request to fulfill based on the assigned priority, forward the storage request to a storage controller, and receive a response to the storage request from the storage controller. The queuing policy is implemented using a rule-based policy engine. In some embodiments, the cache controller is further configured to update one or more monitoring metrics based on processing of the storage request.

20 Claims, 6 Drawing Sheets

(56) References Cited

U.S. PATENT DOCUMENTS

2014/0297780 A1* 10/2014 Zhou ................... H04L 67/2847
  709/216
2014/0331012 A1* 11/2014 Wang .................. G06F 12/0855
  711/140

* cited by examiner

710 — IF: Average size of storage requests on a LUN is above a threshold
   THEN: Reduce priority of read requests above a certain size
   THEN: Increase the size of blocks in the cache 720 — IF: Read requests on a LUN are sequential and above a certain average size
   THEN: Do not cache the data associated with the storage request 730 — IF: Average write request latency increases above a threshold
   THEN: Decrease the priority of other storage requests made to LUNs that
       are contained on the same aggregate/same physical disks 740 — IF: Average latency of storage requests for a LUN crosses a threshold
   THEN: Change priority of storage requests made to the LUN
   THEN: Change priority of other storage requests on the same physical disks
   THEN: If an alert has not been sent in the past X minutes; send alert 750 — IF: Large read requests on a LUN have low priority AND average latency of
     database maintenance on the LUN is getting close to a threshold
   THEN: Increase priority to large read requests on the LUN 760 — IF: Storage request pattern on a LUN suggests passive database copy
   THEN: Send query to task management system to confirm
   THEN: If confirmed; move the LUN to the passive database queue 770 — IF: Storage request pattern on a LUN suggests an active database copy
   THEN: Move corresponding storage requests to highest priority queue 780 — IF: Cache hit percentage crosses a threshold
   THEN: Change the size of the cache

*FIG. 7*

SYSTEM AND METHOD FOR IMPROVED STORAGE REQUEST HANDLING IN HOST-SIDE CACHES

TECHNICAL FIELD

The present disclosure relates generally to computing systems, and more particularly to improved storage request handling in host-side caches.

BACKGROUND

In a computing environment using distributed storage, computer storage may be provided to one or more users or applications using a highly abstracted infrastructure. This means that the characteristics and locations of the disk drives, storage arrays, and servers where the actual storage takes place are typically hidden from the user or application accessing the storage. The user or application accesses the distributed storage by referencing its symbolic or virtual location, and the distributed storage system automatically translates the virtual location into a physical location where the requested storage is actually stored and forwards the storage request to the physical device at that location. This allows the vendor providing the storage to exercise extensive flexibility in deciding how and where to implement the storage as the distributed storage system may simply change how it translates the virtual location requested by the user or application. This includes the ability to move storage from one storage device to another to address capacity, workload, and/or other requirements. These changes in implementation details are often hidden or transparent from the application or the user, which access the storage by making storage requests using an interface, such as an application programming interface (API), and providing the virtual location information for the requested storage. These virtualized and/or abstracted features of distributed storage systems may make them useful in cloud computing systems.

And while distributed storage provides great flexibility to the storage provider, it often comes with some cost to the application or user. For example, distributed storage is typically accessed over a network, such as the Internet. This may add significant overhead to storage requests as both the storage request and the response to the storage request may have to travel across the network. At a minimum this introduces latency or delay in the handling of the storage requests. One possible solution to reduce this latency or delay is through the use of a host-side cache. With a host-side cache, a higher speed storage device is installed into the host where the storage requests are being made. The host-side cache is used to store data from recent storage requests so that follow-up requests to the same storage may be more rapidly handled by the host-side cache, rather than requiring the more latency inducing round trip across the network. As storage requests are processed at the host, the host-side cache is checked before forwarding the storage request across the network. As with the rest of the distributed storage handling, the presence and use of the host-side cache is transparent to the user or the application, which continue to make storage requests normally.

Caching systems, such as the host-side cache, are typically implemented as a way to improve the responsiveness of a system. They are based on the general observation that once a storage request is made for a particular block of storage, a follow-up request within that same block of storage is more likely than not to occur in the near future. The caching systems typically apply the same caching rule to each block of storage and use a cache-replacement policy, such as least-recently used (LRU or LRU-K) or least-frequently used (LFU), to select which previously cached block of storage is to be overwritten when the cache becomes full. In the case of distributed storage, this model is not as effective as it is with memory systems. Distributed storage systems are often subject to storage requests that receive little or no benefit from host-side caching, where large sequential accesses that do not generally result in follow-up requests to the same blocks of storage in the near future are common.

Accordingly, it would be desirable to provide improved methods and systems for managing host-side caches in storage systems.

BRIEF DESCRIPTION OF THE DRAWINGS

FIG. 7 is a simplified diagram of several example rules that may be used by a rule-based policy engine in a host-side cache according to some embodiments.

Figure 1:
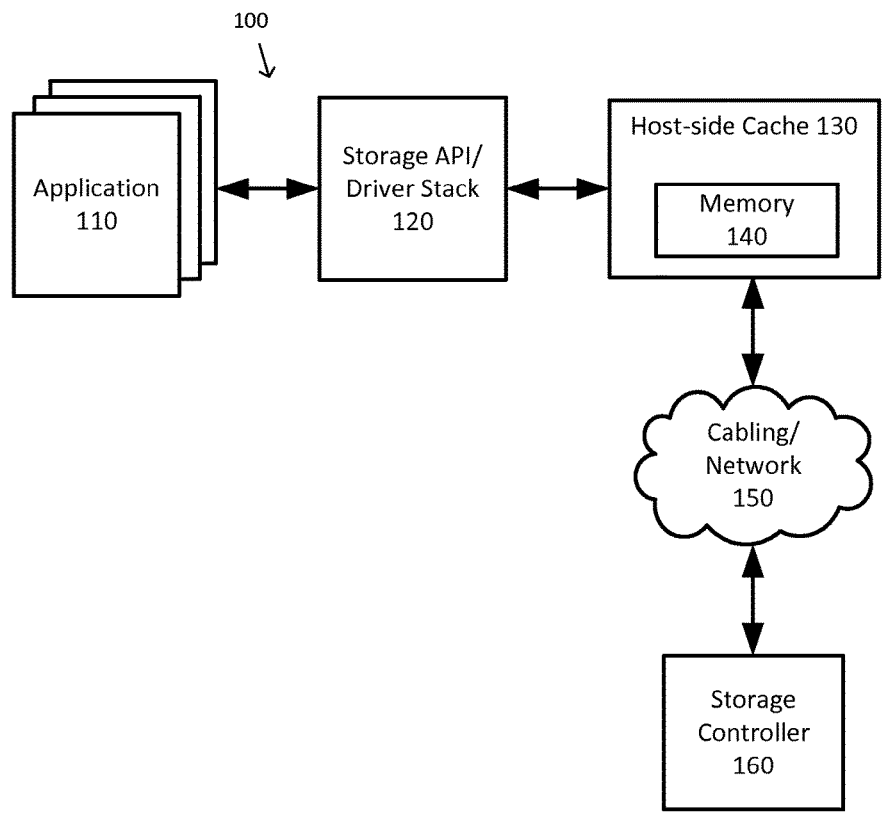
FIG. 1 is a simplified diagram of an example system for handling storage requests according to some embodiments.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

Most caching systems, including host-side caches for distributed storage systems, tend to implement a one-size fits all approach to caching. Each virtual address or location in the storage system is typically treated like all the others and little or no distinction is made between different kinds or patterns of storage requests. This approach works well for caching systems that cache memory in a computer as computer programs exhibit a strong tendency to make follow-up requests in a memory block after a first request to the same memory block. Further, each of the memory requests made by the computer programs typically have the same priority, meaning that it is equally important to respond to all memory requests as quickly as possible.

These storage assumptions, however, generally may not apply as well to storage requests made to storage systems, like distributed storage systems. The properties of storage requests tend to vary significantly in ways that are important to caching strategies. Several types of storage requests are well suited for the traditional caching model in that a rapid/high priority response is requested and follow-up requests to the same storage may typically occur in the near future. For example, these types of storage requests are more likely to occur with database queries and requests for storage within messaging systems, such as email servers. These types of storage requests also tend to request smaller blocks of storage and typically access storage blocks in more random patterns, meaning that each successive series of requests may occur in different areas of the storage system. With these types of requests, the user or application is also expecting as rapid a response as possible to the storage request. In contrast, several other types of storage request typically have a much lower expected response time and may also exhibit access patterns that do not benefit as much from the traditional approach to caching. For example, storage requests associated with archival copying and/or other kinds of background maintenance tasks typically receive much fewer benefits from caching. These other types of storage requests may typically be postponed in favor of higher priority requests, often access much larger blocks of storage, and tend to access these blocks in sequential fashion with few or no follow-up requests in the short term.

One possible solution to improve the handling of storage requests is by using a priority-based approach. In such an approach, the user or application making the storage request could assign a priority to the request. This approach addresses only half the problem as the user or application is usually not supposed to know whether a caching system is present and users and applications do not always appreciate the complexities of storage request handling and distributed storage systems. Another possible solution would be to shift the priority selection to the API or storage software used by the user or application to make the storage requests. And while this may result in better assignments of priorities, it still does not address the caching problem.

A better solution is to enhance the host-side cache system to address both the priority and the caching issues. Because the host-side cache system already receives and processes each of the storage requests and additionally includes significant processing resources to handle its normal caching responsibilities, it provides a suitable location to make both priority and caching decisions for storage requests. This is further advantageous because both the priority and caching decisions typically require analysis of the same properties of the storage requests.

In order to provide flexibility in the making of priority and caching decisions, the host-side caching system may be enhanced by adding several priority queues and a rule-based policy engine. The rules implemented by the policy engine may be used to evaluate the properties of storage requests to determine both a priority for each request and a caching decision regarding the data associated with the storage request. This includes making decisions as to which of the priority queues to place each storage request in, so as to better control how responsive the storage system will be to each request. This also includes making decisions as to whether the data associated with the storage request is to be retained in the cache memory, where it will be available for more rapid access by follow-up requests. The rules may further support monitoring and oversight of both the priority assignment and caching processes. This permits the policy engine to make adjustments to the priority queues and the cache based on observed patterns in the storage requests, the responsiveness of the storage system to storage requests, and to move storage requests between priority queues to meet responsiveness requirements.

FIG. 1 is a simplified diagram of an example system 100 for handling storage requests according to some embodiments. As shown in FIG. 1, storage requests originate from one or more applications 110. The applications 110 may include one or more software packages that make storage requests. These applications 110 may include user applications, service applications, maintenance applications, operating system services, and/or the like. As each of the applications 110 make storage requests they typically do so through a storage API that provides access to a driver stack. The storage API/driver stack 120 provides the applications 110 with access to storage, wherever it may be located in a storage system, using an interface that abstracts the details regarding the location and the devices that implement the storage. In many cases, the storage requested is identified by a storage unit identifier, such as a logical unit number (LUN), and a virtual address, such as a block number, that are included in each storage request made by the applications.

As shown in FIG. 1, system 100 includes a host-side cache 130. Host-side cache 130 provides caching services to the storage requests. Host-side cache 130 may include memory 140 for storing cached data. Memory 140 may include one or more types of machine readable media that provides a good balance between cost and speed that are appropriate to a caching system for storage. Some common forms of machine readable media may include hard disk, RAM, FLASH-EPROM, any other memory chip or cartridge, and/or any other suitable medium from which a processor or computer is adapted to read.

The host-side cache 130 may operate similar to other caching systems. For example, when a read request is made by one of the applications 110 using API/driver stack 120, the host-side cache 130 checks to determine whether the requested data is already stored in memory 140. When the requested data is already stored in memory 140, a cache hit occurs, and the requested data may be returned to the application 110 that made the request without incurring any further delays in sending the read request to the storage device, such as a disk drive or distributed storage device, that contains the data, and waiting for a response. When the requested data is not already stored in memory 140, a cache miss occurs, and the read request is forwarded through cabling or a network 150 to a storage controller 160 or storage system that can access the storage device that contains the requested data. The network 150 may be any kind of network including a local area network (LAN), such as an Ethernet, or a wide area network (WAN), such as the Internet. After the requested data is read from the storage device, it is returned through the host-side cache 130, which stores a copy in memory 140 before returning it to API/driver stack 120 for return to the requesting application 110. Once the requested data is cached in memory 140, a subsequent request made for the same data may favorably result in a cache hit. When memory 140 becomes full, the host-side cache 130 may use a cache-replacement policy, such as LRU, LRU-K, LFU, and/or the like, to select which previously cached data is to be overwritten.

Host-side cache 130 is limited in its ability to handle the particular features of many storage systems, including distributed storage systems. Host-side cache 130 tends to treat each storage request the same way by determining whether a cache hit occurs, forwarding the storage request to storage controller 160 when a cache miss occurs, storing the requested data in memory 140, and implementing a page replacement policy when memory 140 becomes full. Host-side cache 130 also does not generally provide any support for prioritization of the storage request. This approach, while common to many caching systems, does not address the important differences that may exist between different types of storage requests. For example, the size of the data associated with a storage request may vary significantly depending upon the application 110 making the request. Messaging systems, such as Exchange servers, and queries form database systems tend to involve smaller requests, e.g., 32 kbytes, whereas storage requests associated with backup and maintenance tasks may by much larger, e.g., 100s of kbytes or larger. As another example, the type of the storage request may vary as well with the messaging system and database queries typically being random in pattern whereas the backup and maintenance requests are often sequential in pattern so that they access storage locations in order. In addition, the acceptable response time to the messaging system and database query storage requests is also typically much shorter than the response time expected of backup and maintenance requests. This suggests that the smaller messaging system and database query storage requests are to be assigned a higher priority than the backup and maintenance requests. The random pattern of the messaging system and database query storage requests are also more likely to benefit from caching than the sequential storage requests associated with the backup and maintenance tasks.

Figure 2:
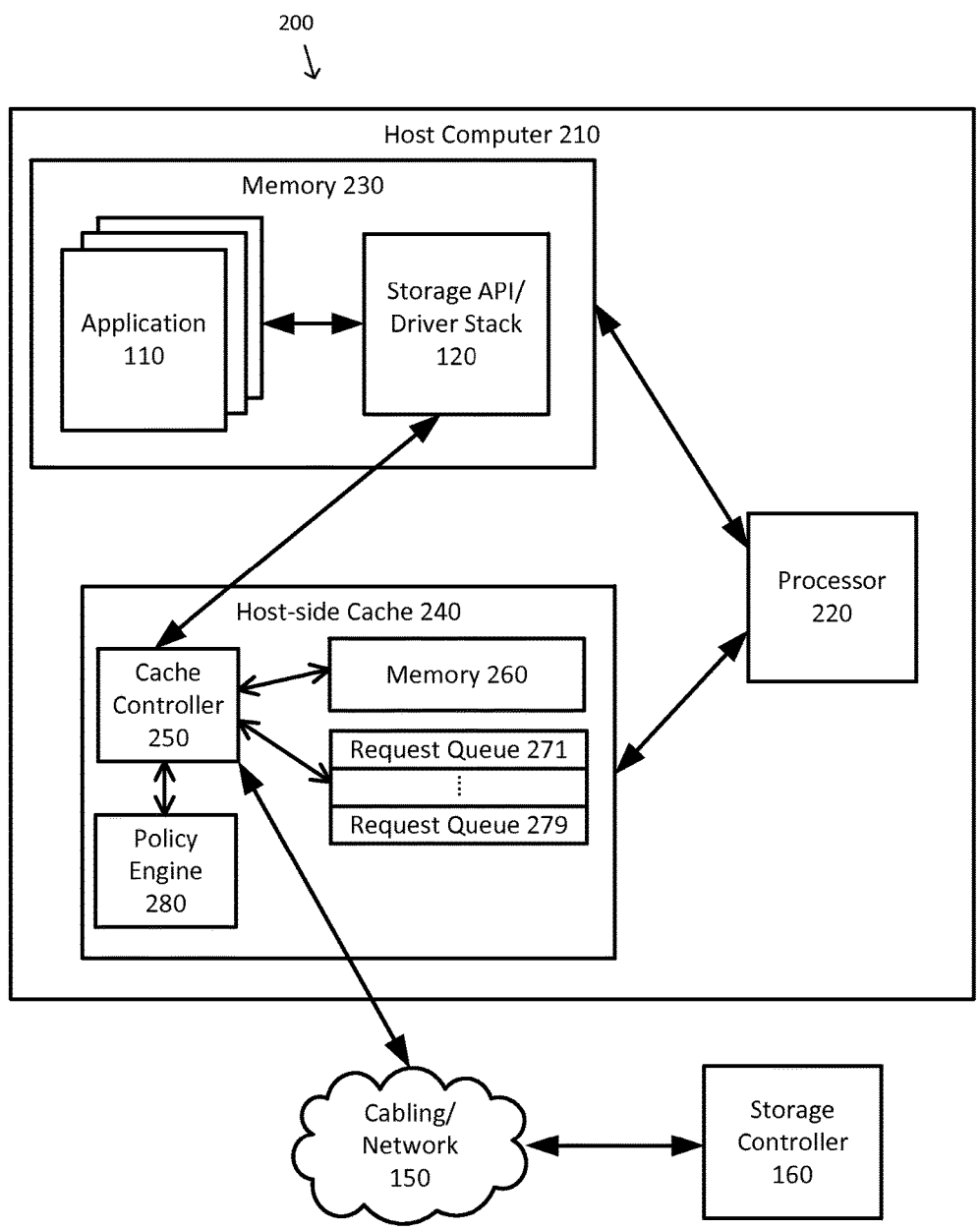
FIG. 2 is a simplified diagram of another example system for handling storage requests according to some embodiments.

FIG. 2 is a simplified diagram of another example system 200 for handling storage requests according to some embodiments. In contrast to system 100 as shown in FIG. 1, system 200 of FIG. 2 provides greater detail regarding the interrelationships between the applications, host-side cache, and storage controller. As shown in FIG. 2, system 200 includes a host computer 210. Host computer 210 may be any kind of computer system including a standalone workstation, a cluster, a production server, within a virtual machine, and/or the like. Host computer 210 includes a processor 220 coupled to memory 230. In some examples, processor 220 may control operation and/or execution of hardware and/or software on host computer 210. Although only one processor 220 is shown, host computer 210 may include multiple processors, multi-core processors, and/or the like. Memory 230 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 230 may be used to store several software packages and systems that are executed by processor 220. This includes at least the one or more applications 110 and the API/driver stack 120. Similar to system 100, in system 200, storage requests are originated by the applications 110 through API calls to the API/driver stack 120. The storage requests are then passed on to a host-side cache 240.

Host-side cache 240 is capable of much greater sophistication than host-side cache 130 in the handling of storage requests. Host-side cache 240 includes a cache controller or cache control unit 250, cache memory 260, and request or priority first-in first-out (FIFO) queues 271-279. Operation of the host-side cache 240 is managed by the cache controller 250 which may be executed by processor 220 or operate in cooperation with processor 220. Host-side cache 240 may be implemented using software or a combination of hardware and software. For example, when the host-side cache 240 is implemented as a stand-alone subsystem and/or board added to host computer 210, the host-side cache 240 may be coupled to processor 220 using one or more buses.

The storage requests or requests for storage operations made by the applications 110 are forwarded to the host-side cache 240 by the API/driver stack 120 where they are processed by the cache controller 250. When a storage request is received by the cache controller 250, the cache controller 250 examines the storage request and determines one or more properties of the storage request. Using a rule-based policy engine 280, the cache controller 250 inserts the storage request into a corresponding one of the request queues 271-279 based on the determined properties. Each of the request queues 271-279 is assigned a different priority or a quality of service (QoS) that helps ensure that the service request is processed and completes within a desired latency or delay. For example, storage requests associated with messaging systems and database queries may be inserted into request queues 271-279 with higher priority than the request queues 271-219 used for storage requests associated with backup and maintenance operations. In some cases, the cache controller 250 may observe that one or more of the request queues 271-279 is full and cannot accept further storage requests. When this occurs, the cache controller 250 may refuse to accept the storage request and report to the API/driver stack 120 that it is busy and the storage request may be submitted again at a later time. In some examples, when the storage request is associated with data that is already cached in memory 260 (e.g., during a cache hit), the storage request may be handled right away without inserting the storage request into one of the request queues 271-279.

The rule-based policy engine 280 may further be used to determine whether the data associated with the storage request is to be cached in memory 260. For example, data associated with messaging system and database query storage requests are more likely to be cached in memory 260 than data associated with backup and maintenance storage requests. In some examples, data associated with storage requests that are smaller in size and access storage locations in an apparently randomly pattern is more likely to be cached than data associated with storage requests that are larger in size and access storage locations sequentially.

In parallel with the receipt of and examination of storage requests, the cache controller 250 may further extract storage requests from the request queues 271-279 and then forward them on to storage controller 160 or storage system using the cabling or network 150. Based on the priority assigned to each of the request queues 271-279, the cache controller 250 may select a next storage request to be processed, remove it from the corresponding request queue 271-279, and then forward it onto the storage controller 160. For example, the cache controller 250 may select the next storage request as the storage request that has moved to the head of the highest priority of the request queues 271-279 that contain storage requests. When the storage controller 160 completes the processing for the storage request, the storage controller 160 may return a response to the cache controller 250. Based on the content of the response and the caching determination for the storage request, the data associated with the storage request may be cached in memory 260. For example, when the response includes data read from a storage device based on a read request that is to be cached, the data may be cached in memory 260. In some examples, when the storage request extracted from the request queue 271-279 is associated with data that is already cached in memory 260 (e.g., during a cache hit), the storage request may be handled right away without forwarding the storage request to storage controller 160. This may occur, for example, when another storage request processed between the time the extracted storage request was inserted into the request queue 271-279 and its later extraction by the cache controller 250 results in the caching of the data associated with the extracted storage request.

The cache controller 250 may also be responsible for monitoring each of the storage requests as they are received from the API/driver stack 120 and when a response is received from storage controller 160. In some examples, the cache controller 250 may maintain one or more metrics or summary statistics associated with the storage requests, such as counts of a number of each type of storage request, average storage request size, average response time between receipt of a storage request and return of a result, and/or the like. In some examples, the cache controller 250 may maintain metrics and/or statistics separately for each type of storage request for each of the request queues 271-279, and/or for each LUN. In some examples, the cache controller 250 may periodically make adjustments to one or more characteristics of the request queues 271-279 or cache memory 260. This may include changing the priority of one or more of the request queues 271-279, moving storage requests from one request queue 271-279 to another request queue 271-279, adjusting the size of storage blocks used in cache memory 260, changing the decision criterion used for caching decisions, and/or the like. Any of these changes may occur as a result of changes in the metrics or summary statistics or based on observed patterns in the storage requests. As part of this periodic evaluation, the cache controller 250 may exchange messages or request confirmations regarding storage requests from the applications 110, the API/driver stack 120, or other controllers in system 200. The cache controller 250 may also send one or more alerts when certain observations are made about the host-side cache 240 and its processing of storage requests.

Structuring the cache controller 250 to use the rule-based policy engine 280 may make the cache controller 250 much more flexible in handling storage requests. Rule-based systems are generally more flexible than hard-coded systems in implementing user-specific policies, allowing run-time changes to the rules, and adjusting to changes in use of a system. By replacing one or more rules in the rule set used by the rule-based policy engine 280, the user or administrator may be able to alter how the host-side cache 240 operates. This may include changing how particular types of storage requests are assigned to the request queues 271-279, changing which data associated with the storage requests gets cached in memory 250, changing the latency thresholds that are acceptable for different types of storage request, etc. The options are limited only by the flexibility in the rule set and how the rule-based policy engine 280 processes the rule set.

The scope of embodiments is not limited to the structure and arrangement shown in FIG. 2. According to certain embodiments, more than one host computer may be used in system 200. In some examples, each of the applications 110, the API/driver stack 120, and/or the host-side cache 240 may each be hosted in any combination of two or more host computers like host computer 210. In some examples, each of the two or more host computers may be virtual machines hosted in the same computer or in more than one computer. In some examples, host computer 210 may be a virtual machine. According to certain embodiments, storage controller 160 may alternatively be hosted within host computer 210 rather than as separately shown in FIG. 2. According to certain embodiments, system 200 may include more than one storage controller like storage controller 160. In some examples, each of the storage controllers may be responsible for handling different storage requests associated with different LUNs.

Figure 3:
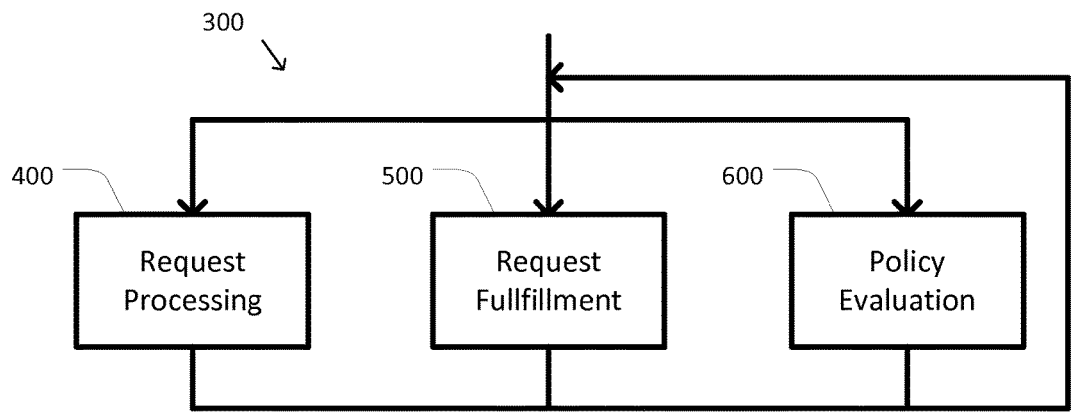
FIG. 3 is a simplified diagram of an example method of host-side cache operation according to some embodiments.

FIG. 3 is a simplified diagram of an example method 300 of host-side cache operation according to some embodiments. One or more of the processes 400, 500, and/or 600 of method 300 may be implemented, at least in part, in the form of executable code stored on non-transient, tangible, machine readable media that when run by one or more processors (e.g., the processor 220) may cause the one or more processors to perform one or more of the processes 400, 500, and/or 600. For example, method 300 may be implemented by the cache controller 250.

As shown in FIG. 3, method 300 includes three processes 400, 500, and 600, which may be operated in parallel. Process 400 is responsible for the initial processing of storage requests as they are received by the host-side cache. This includes receiving the storage requests from APIs and driver stacks, assigning the storage requests to request queues of varying priorities, and determining when the data associated with the storage requests is to be cached. Process 500 is responsible for the handling of storage requests in a suitable order. This includes examining which of the request queues contain pending storage requests, extracting the next storage request to fulfill, and forwarding the storage request to the desired storage controller. Process 600 is responsible for the periodic reevaluation of the queuing/priority and caching policies used by the host-side cache. This includes examining metrics and statistics that have been gathered about the storage requests and making adjustments to the request queues, the cache, and the other operations of the host-side cache. According to certain embodiments, method 300 and the processes 400, 500, and/or 600 may be implemented, at least in part, using a rule-based policy engine, such as the rule-based policy engine 280.

The scope of embodiments is not limited to the arrangement as shown in FIG. 3. According to certain embodiments processes 400, 500, and 600 may alternatively be operated in an event-driven fashion rather than as parallel processes. In some examples, the request processing of process 400 may be executed when a storage request is received and may be otherwise dormant. In some examples, the policy evaluation of process 600 may occur at specific intervals, such as in response to a periodic timer interrupt.

Figure 4:
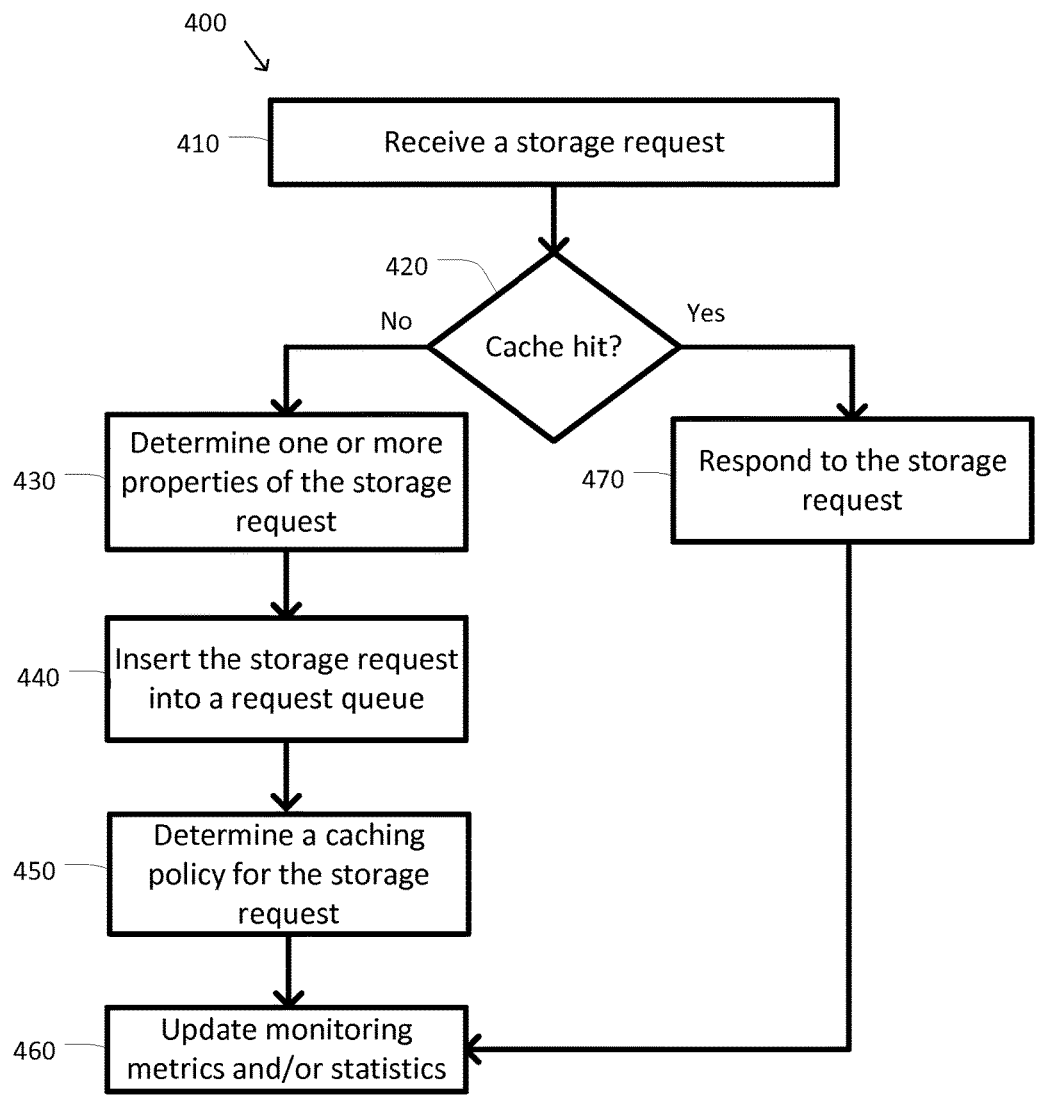
FIG. 4 is a simplified diagram of an example process of storage request handling in a host-side cache according to some embodiments.

FIG. 4 is a simplified diagram of an example process 400 of storage request handling in a host-side cache according to some embodiments. One or more of the processes 410-470 of process 400 may be implemented, at least in part, in the form of executable code stored on non-transient, tangible, machine readable media that when run by one or more processors (e.g., the processor 220) may cause the one or more processors to perform one or more of the processes 410-470. For example, process 400 may be implemented by the cache controller 250.

At a process 410, a storage request is received. The storage request may be received from an application, such as any one of the applications 110, or from an API/driver stack, such as the API/driver stack 120. The storage request may be received by a cache controller such as the cache controller 250 in host-side cache 240.

At a process 420, it is determined whether a cache hit occurs. A cache hit occurs when the data associated with the storage request received during process 410 is already cached in cache memory of the host-side cache. For example, when the storage request is a read request and the requested data is already in the cache memory as a result of a previous storage request, a cache hit has occurred. When the requested data is not already in the cache memory, a cache miss occurs. When a cache hit occurs, the storage request may be further processed beginning with a process 470. When a cache miss occurs, the storage request may be further processed beginning with a process 430.

At the process 430, one or more properties of the storage request are determined. The storage request received during process 410 is examined to determine one or more properties or characteristics that may be relevant to a priority that is to be assigned to the storage request and/or whether the data associated with the storage request is to be cached by the host-based cache. The one or more properties may include the LUN associated with the storage request, the size of the data block requested by the storage request, whether the storage request is a read or a write request, whether the storage request is a sequential or a random request, whether the storage request originates from a particular type of application, whether the storage request is part of a pattern of related storage requests, and/or the like.

At a process 440, the storage request is inserted into a request queue. Using the one or more properties determined during process 430, the storage request is assigned a priority using a queuing or priority policy. In some examples, the priority may be assigned to help ensure that the storage request is processed within an acceptable delay or latency. Based on the assigned priority, the storage request is inserted into a corresponding FIFO request queue, such as any of the request queues 271-279, with a corresponding priority, QoS setting, or latency goal. For example, storage requests associated with messaging systems and database queries may be inserted into request queues with higher priority than the request queues used for storage requests associated with backup and maintenance operations. In some examples, the determination of the assigned priority and/or the selection of a request queue may be based on one or more rules evaluated by a rule-based policy engine, such as the rule-based policy engine 280, associated with the cache controller.

At a process 450, a caching policy for the storage request is determined. Using the one or more properties determined during process 430, the caching policy for the data associated with the storage request is determined. This may be used to determine whether the data retrieved as part of a read request or the data to be written as part of a write request is to be cached in the memory of the host-side cache. For example, data associated with messaging system and database query storage requests are more likely to be cached in the host-side cache than data associated with backup and maintenance storage requests. In some examples, the determination of the caching priority may be based on one or more rules evaluated by the rule-based policy engine associated with the cache controller.

At a process 460, monitoring metrics and/or statistics are updated. Based on the one or more properties determined during process 430, one or more monitoring or processing metrics and/or statistics associated with the host-side cache may be updated. The cache controller may determine counts of how many storage requests with certain properties are received during a time interval. For example, the cache controller may count the number of cache hits and misses, count the number of storage requests for data that is 32 kbytes in size or smaller, and/or track the average size of storage requests. In some examples, the metrics and/or statistics may be collected separately for each LUN, separately for each request queue, and/or in aggregate for the entire host-side cache. In some examples, the cache controller may further monitor the storage requests looking for patterns in the storage requests. For example, this monitoring may be used to detect a series of large sequential requests made to a particular LUN, such as a LUN associated with a database server. With the updates to the monitoring metrics and/or statistics, the initial processing of the storage request received during process 410 is complete and process 400 may repeat when another storage request is received.

At the process 470, the storage request is responded to. When a cache hit occurs, the storage request may be processed without having to insert the storage request into one of the request queues. For example, when the data requested in a read request is already stored in the cache, the requested data may be quickly read from the cache and returned as a response to the API/driver stack that made the read request. In some examples, when the host-side cache supports caching of write requests, the data in the write request may be stored in the cache and a corresponding response may be generated and returned to the API/driver stack that made the write request. After the response is responded to, the monitoring metrics and/or statistics are updated using process 460.

The scope of embodiments of process 400 is not limited to the arrangement of processes as shown in FIG. 4. According to certain embodiments process 400 may support request queues of finite size, such as 20, 10, or even smaller. In some examples, during process 440, the cache controller may determine whether the selected request queue is full before inserting the storage request into the selected request queue. When this occurs, the cache controller may refuse to accept the storage request and report to the API/driver stack that made the storage request that the host-side cache is busy and the storage request may be submitted again at a later time. According to certain embodiments, process 470 may provide alternative processing for write requests. In some examples, when a write request is handled after a cache hit, the cache controller may generate a write-through storage request that is handled by processes 430-460 so that the data written by the write request is sent to the storage device that is to store the data.

Figure 5:
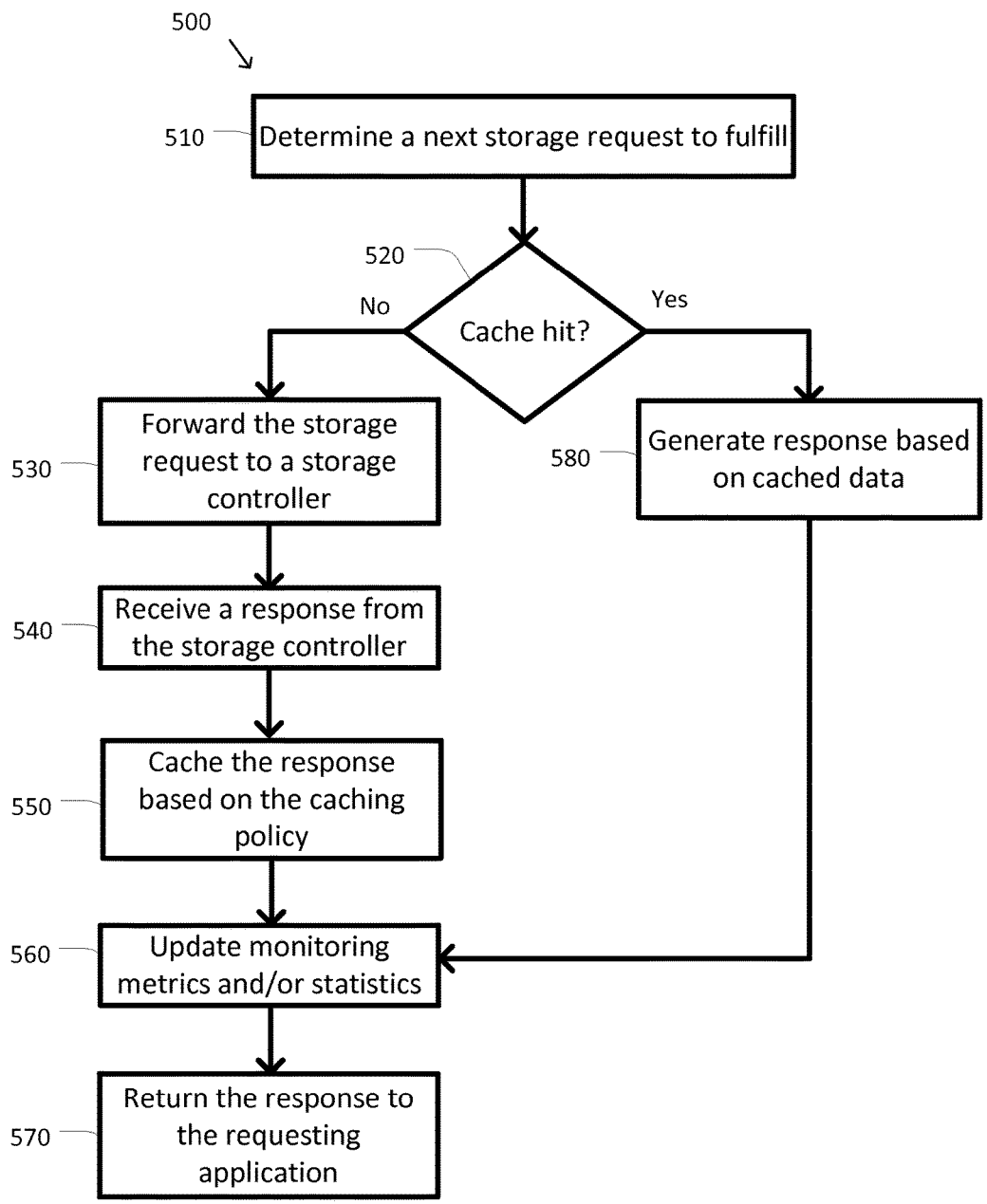
FIG. 5 is a simplified diagram of an example process of storage request fulfillment in a host-side cache according to some embodiments.

FIG. 5 is a simplified diagram of an example process 500 of storage request fulfillment in a host-side cache according to some embodiments. One or more of the processes 510-580 of process 500 may be implemented, at least in part, in the form of executable code stored on non-transient, tangible, machine readable media that when run by one or more processors (e.g., the processor 220) may cause the one or more processors to perform one or more of the processes 510-580. For example, process 500 may be implemented by the cache controller 250.

At a process 510, a next storage request to fulfill is determined. Each of the request queues being maintained by the cache controller in the host-side cache is examined to determine the next storage request that is to be fulfilled. In some examples, the next storage request to be fulfilled may be the storage request that has been in the highest priority request queue for the longest amount of time. In some examples, the next storage request to be fulfilled may be the storage request that has moved to the head of the of the highest priority of the request queues that contain storage requests. In some examples, the determination of the next storage request may additionally consider a respective length of time that each of the storage requests has been in its corresponding request queue. In some examples, other multi-queue and priority strategies may be used to select the next storage request to fulfill. Once the next storage request to fulfill is determined, it is extracted from the corresponding request queue.

At a process 520, it is determined whether a cache hit occurs. A cache hit occurs when the data associated with the storage request determined during process 510 is already cached in cache memory of the host-side cache. For example, when the determined storage request is a read request and the requested data is already in the cache memory as a result of a previous storage request, a cache hit has occurred. Although cache hits are generally handled by the determination of process 420 when the determined storage request was initially received by the cache controller, it is possible that another storage request, processed between the time the determined storage request was inserted into its corresponding request queue and its later extraction during process 510, may have cached the associated data. When the requested data is not already in the cache memory, a cache miss occurs. When a cache hit occurs, the storage request may be further processed beginning with a process 580. When a cache miss occurs, the storage request may be further processed beginning with a process 530.

At the process 530, the storage request is forwarded to a storage controller. Because the storage request determined during process 510 cannot be handled based on previously cached data, the storage request is passed onto a corresponding storage controller for processing. For example, a read request that resulted in a cache miss may be satisfied by forwarding the read request to the storage controller responsible for the storage device that is storing the requested data. In some examples, the storage controller to use may be selected based on the LUN associated with the storage request.

At a process 540, a response is received from the storage controller. When the storage controller completes the handling of the storage request forwarded to the storage controller during process 540, it returns a response to the host-side cache. For example, when the storage request is a read request, the response may include the requested data. In another example, when the storage request is a write request, the response may include a confirmation that the write is successfully completed.

At a process 550, the response is cached based on the caching policy. The caching policy for the storage request determined during process 450 is implemented. For example, when the data retrieved as part of a read request is to be cached, the retrieved data is stored in the host-side cache. Because the storage capacity of the host-side cache is finite, the retrieved data may be stored in place of previously cached data using a cache replacement strategy, such as LRU, LRU-K, LFU, and/or the like.

At a process 560, monitoring metrics and/or statistics are updated. Based on one or more properties associated with the handling of the storage request determined during 510, one or more monitoring or processing metrics and/or statistics associated with the host-side cache may be updated. For example, the cache controller may determine a latency associated with the processing of the storage request. This may include the total time taken from the receipt of the storage request during process 410 to the start of process 560. This may also include the time taken between the forwarding of the storage request during process 530 to the receipt of the corresponding response during process 540. In some examples, aggregating statistics such as average latency and/or longest latency for a given period of time may be determined. In some examples, the metrics and/or statistics may be collected separately for each LUN, separately for each request queue, and/or in aggregate for the entire host-side cache.

At a process 570, the response is returned to the requesting application. Upon completion of the processing for the storage request determined during process 510, the response to the storage request is returned to the requesting application. This may occur by returning the response to the API/driver stack, which in turn returns the response to the requesting application. Depending upon whether a cache hit occurred, either the response received from the storage controller during process 540 or the response generated during process 580 is returned. Once the response is returned, process 500 may repeat with the determination of a new next storage request using process 510.

At the process 580, a response based on cached data is generated. When a cache hit occurs, the storage request may be processed without having to forward the storage request to a corresponding storage controller. For example, when the data requested in a read request is already stored in the cache, the requested data may be quickly read from the cache and used to generate the response. After the response is generated, the monitoring metrics and/or statistics are updated using process 570.

The scope of embodiments of process 500 is not limited to the arrangement of processes as shown in FIG. 5. According to certain embodiments, caching decisions may be determined after fulfillment of a storage request by the storage controller. In some examples, the determination of whether or not to cache the data associated with a storage request may be postponed from process 450 until after the response to the storage request is received during process 540. This permits the caching decision to be based on the caching criteria in place at the time of storage request fulfillment rather than at the time the storage request is received by the host-based cache. In some examples, process 550 may include the determination of process 470 so that process 550 includes both the determination of the caching policy and its application to the data associated with the storage request.

According to certain embodiments, process 500 may support additional parallelism that is not fully depicted in FIG. 5. In some examples, the forwarding of storage requests during process 530 and the subsequent processing of the response in processes 540-570 may be handled in a multi-threaded fashion. Because it may take more than a trivial amount of time between the forwarding of a storage request during process 530 and the receiving of a response during process 540, once the storage request is forwarded during process 530, the process 500 may return to process 510 to determine a further storage request to fulfill. In this way multiple storage requests may be forwarded before a response is received for any of them. This allows for a more time efficient concurrent processing of storage requests by the various storage controllers.

According to certain embodiments, process 550 may also provide support for a write-back policy when cache replacement occurs. In some examples, when a block of cache is replaced to make room for newly cached data, a write request may be generated for handling by one or more of the processes 430-460 so that the replaced data may be sent to the storage device that is to store the data. In some examples, a pool of several replaceable cache blocks may be maintained so that when cache replacement occurs, an available block is immediately available for the newly cached data. This allows for more leisurely handling of the write-back policy using the processes 430-460 without adding additional delay in responding to the storage request that is being cached during process 550. Once the replaced block has been written back, the corresponding cache block may be added to the pool of replaceable cache blocks.

According to certain embodiments, the host-side cache may support one or more additional queues. In some examples, after the response is received from the storage controller during process 540, it may be assigned to and placed into a response queue. When the response reaches the head of the response queue, it may be cached during process 550 and/or returned to the requesting application or the API/driver stack during process 570. The monitoring metrics and/or statistics may further be updated during process 560 based on the length of time the response may have spent in the response queue.

Figure 6:
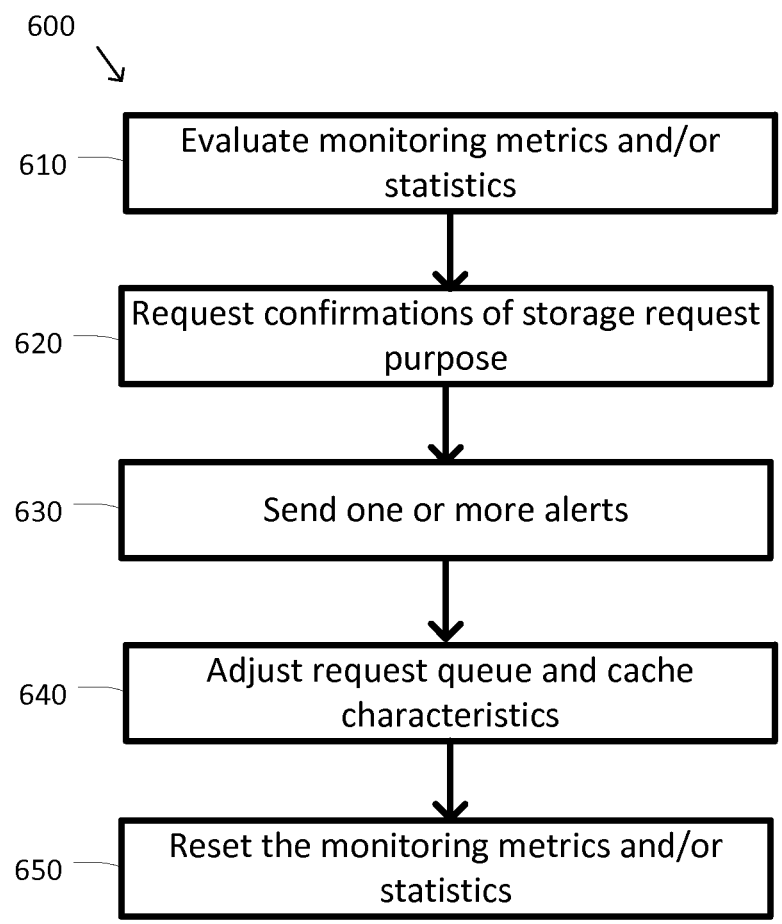
FIG. 6 is a simplified diagram of an example process of policy evaluation in a host-side cache according to some embodiments.

FIG. 6 is a simplified diagram of an example process 600 of policy evaluation in a host-side cache according to some embodiments. One or more of the processes 610-650 of process 600 may be implemented, at least in part, in the form of executable code stored on non-transient, tangible, machine readable media that when run by one or more processors (e.g., the processor 220) may cause the one or more processors to perform one or more of the processes 610-650. For example, process 600 may be implemented by the cache controller 250. In some examples, process 600 may be performed periodically.

At a process 610, monitoring metrics and/or statistics are evaluated. The monitoring or processing metrics and/or statistics updated during processes 460 and 560 are evaluated. The monitoring metrics and/or statistics may be evaluated to determine whether adjustments are to be made to the queuing and/or caching policy of the host-side cache. This evaluation may be performed based on one or more policy rules. For example, when the responsiveness of the host-side cache to certain storage requests is too slow, as reflected in the latency metrics and statistics collected, this may indicate that the priority assigned to these storage requests is to be increased. In another example, when the hit rate for the host-side cache is too high or too low this may indicate that the cache or the cache block size is to be changed or that more or fewer storage requests are to be designated for caching of their data. In yet another example, when patterns in the storage requests are detected, this may indicate that the corresponding storage requests are to be assigned different priorities and/or caching determinations.

At an optional process 620, confirmations of storage request purpose may be requested. When a pattern is detected in the storage requests during process 610, it may be possible to confirm that the pattern of storage requests is consistent with a specified purpose. When the storage requests for applications and/or the API/driver stack are managed by certain types of servers and/or task managers, it may be possible to request confirmation from the servers and/or task managers of the purpose for the storage requests. For example, task managers such as PowerShell may be queried to determine the purpose of a sequence of storage requests, with PowerShell returning a corresponding confirmation.

At an optional process 630, one or more alerts may be sent. When any of the monitoring metrics and/or statistics is outside of a range of acceptable values, the cache controller may send one or more alerts to users and/or operators of the host-side cache. For example, when an average latency for certain types of storage requests becomes longer than a desired threshold, the users and/or operators may be alerted. This may be done by adding the alerts to a log, sending a page, text, or email message, and/or using other alerting mechanisms.

At a process 640, request queue and cache characteristics may be adjusted. Based on the evaluation performed during process 610, one or more characteristics of the request queues and/or the cache may be adjusted. This may include changing the size of the cache or the cache blocks, altering the priorities and request queues to which storage requests are assigned, changing the caching criteria, moving storage requests between request queues, and/or other related activities. In some examples, the adjustments made may occur as a result of one or more rules evaluated by the rule-based policy engine associated with the cache controller.

At a process 650, the monitoring metrics and/or statistics may be reset. When the monitoring metrics and/or statistics are collected over a time interval, these monitoring metrics and/or statistics may be periodically reset to begin the collection process again. For example, an average latency statistic or a count value may be reset to zero. In some examples, the monitoring metrics and/or statistics may be reset by adjusting a sliding window that contains the most recently collected data. In some examples, techniques such as exponential smoothing may be used to provide stronger emphasis on more recently collected metrics over less recently collected metrics.

The scope of embodiments is not limited to the processes shown in FIG. 6. According to certain embodiments, the process 600 of policy evaluation in a host-side cache can be performed using variations among the processes 610-650 as would be recognized by one of ordinary skill in the art. In some examples, one or more of the processes 620 and/or 630 are optional and may be omitted.

FIG. 7 is a simplified diagram of several example rules that may be used by a rule-based policy engine in a host-side cache according to some embodiments. One of ordinary skill in the art would recognize that the provided rules are illustrative only and that many other rules may be developed to address other queuing and caching policy concerns. Each of the rules is depicted in IF-THEN form with the IF clause describing a condition that is to be met before the THEN clause is enacted. For some of the rules, more than one THEN clause or action may be present. Each of the rules is explained below in the context of the processes 300, 400, 500, and 600.

A rule 710 is an example of both a queuing and a caching rule that may be used to adjust the request queue and cache characteristics during process 640 so that priority determinations made during process 440 and caching determinations made during process 450 may adjust to changes in the storage requests being handled by the host-side cache. As shown in rule 710, when the average size of storage requests for any LUN exceed a first threshold, the priority of read requests made to that LUN that are larger than a second threshold are reduced in priority so that they are assigned to a request queue with lower priority. In addition, the size of the cache blocks is increased to more effectively handle the overall larger size of these storage requests.

A rule 720 is an example of a caching rule that may be used to make caching determinations during process 450. Rule 720 describes that when a series of read requests made to a LUN are sequential in type and are above an average size threshold that data associated with those storage requests are not to be cached. Rule 720 implements the general policy that large sequential read requests do not generally benefit from caching. By omitting these read requests from the caching, this allows the cache to be smaller in size and may improve the cache hit rate for other storage requests using the host-side cache.

A rule 730 is an example of a queuing rule that may be used to adjust the request queue characteristics during process 640 so that priority determinations made during process 440 may adjust to changes in the storage requests being handled by the host-side cache. Rule 730 describes that when the average write request latency increases above a threshold that the priority of other storage requests made to the same physical storage devices is to be decreased. This rule helps the host-side cache adjust to undesirable increases in write request latency by lowering the priority and thus the number of other storage requests made to the same physical devices.

A rule 740 is another example of a queuing rule that may be used to adjust the request queue characteristics during process 640 so that priority determinations made during process 440 may adjust to changes in the storage requests being handled by the host-side cache. Rule 740 indicates that when the average latency of storage requests made to a LUN cross a threshold that the priority of storage requests to that LUN are to be changed as well as the priority of other storage requests made to the same physical disks. Rule 740 also describes that an alert may be generated during process 630 when a similar alert has not been generated for a specified period of time. In some examples, the period of time may be 30 minutes, 60 minutes, or some other reasonable period of time. In some examples, rule 740 may be replaced in practice by two separate rules. In a first variation, when the average latency is above the threshold, the priority of the storage requests may be increased and the priority of the other storage requests may be decreased. This helps reduce the average latency of the storage requests. In a second variation, when the average latency is below the threshold, the priority of the storage requests may be decreased and the priority of the other storage requests may be increased. This allows the host-side cache to slow down its responsiveness to the storage requests for the benefit of the other storage requests made to the same physical disks.

A rule 750 is another example of a queuing rule. Rule 750 indicates that when large storage requests made to a certain LUN are assigned a low priority during process 440 and the average latency of storage requests associated with database maintenance operations on the same LUN are approaching a threshold, the priority of large read requests made to the LUN is to be increased. Rule 750 is used when the latency of storage requests associated with database maintenance requests on a LUN, as monitored during process 560, approach an undesirable value that the latency of these requests may be lowered by increasing the priority assigned to large read requests to the same LUN.

A rule 760 is an example of a rule based on a storage request pattern. Rule 760 indicates that when the cache controller observes a pattern of storage requests on a LUN consistent with the passive copying of a database, such as during a backup operation, that a confirmation request is to be made during process 620. For example, a pattern of large sequential storage requests may indicate that passive copying of a database may be occurring. When rule 760 is applied and the pattern is detected, the cache controller may send a confirmation to the task manager, such as PowerShell, for confirmation that a passive database copying operation is actually taking place. When the confirmation is received, the queuing rule applied during process 440 assigns a corresponding priority to storage requests made to the LUN so that those storage requests are inserted into the passive database request queue.

A rule 770 is an example of a rule that may result in movement of storage requests from one request queue to another request queue during process 640. Rule 770 indicates that when a pattern of storage requests on a LUN is detected that is consistent with an active database copy, such as might occur during a database query or update, the storage requests associated with the pattern are to be moved to the highest priority request queue. This may include moving storage requests from the same pattern, which are already in lower priority request queues, to the highest priority request queue.

A rule 780 is an example of a caching rule that may be used to adjust the cache characteristics during process 640 so that the host-side cache may adjust to changes in the storage requests it is handling. Rule 780 indicates that when the percentage of cache hits (i.e., the cache hit rate) crosses a threshold that the size of the cache is to be adjusted accordingly. Like rule 740, in practice rule 780 may be replaced by two different rules. In a first variation, when the cache hit rate is too low, this may indicate that not enough data is being cached and the cache size is to be increased. In a second variation, when the cache hit rate is too high, this may indicate that too much data is being cached and too much memory is being dedicated to cache and the cache size is to be decreased.

Some examples of host computer 210 and host-side cache 240 may include non-transient, tangible, machine readable media that include executable code that when run by one or more processors may cause the one or more processors (e.g., the processor 220) to perform the processes of method 300 and processes 400, 500, and/or 600 as described above. Some common forms of machine readable media that may include the processes of method 300 and processes 400, 500, and/or 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method, comprising:
    evaluating a storage request by a processor of a computing device having a cache memory, the computing device communicating with a storage controller using a network connection, and the storage controller storing data for a plurality of applications at storage devices external to the computing device, wherein the storage request is evaluated by examining a characteristic of the storage request including a type of application originating the storage request and a pattern of related storage requests;

assigning by the processor, a priority to the storage request based on the characteristic of the storage request and an associated queuing policy, when data associated with the storage request is unavailable at the cache memory of the computing device for processing the storage request;

placing by the processor, the storage request at a queue from a plurality of queues of the cache memory based on the assigned priority of the storage request, wherein each of the plurality of queues has a corresponding priority and a quality of service setting indicating a latency goal for storage requests stored at the plurality of queues;

determining by the processor, a caching policy associated with the storage request based on the characteristic, for identifying a caching priority for data associated with the storage request;

evaluating by the processor, the plurality of queues and priority of other storage requests stored at the plurality of queues for selecting the storage request for processing;

transmitting by the processor, the storage request to the storage controller for processing;

processing by the processor, a response to the storage request from the storage controller based on the caching policy, wherein the response is cached at the cache memory based on the caching policy;

updating by the processor, a monitored caching metric from among a plurality of monitored caching metrics, based on the characteristic of the storage request and processing of the response to the storage request; and modifying by the processor, one of a plurality caching policies based on a confirmed purpose for a detected pattern involving a sequence of storage requests.

2. The method of claim 1, further comprising:
modifying by the processor, one of queuing policies based on the confirmed purpose.

3. The method of claim 1, further comprising:
processing the storage request without having to use the plurality of queues, when data associated with the storage request is already available at the cache memory.

4. The method of claim 1, wherein a purpose of the plurality of storage requests for the detected pattern is confirmed with an originator of the plurality of storage requests.

5. The method of claim 1, wherein the plurality of monitored caching metrics include a number of storage requests of each type, a hit rate for the cache memory, an average size of data blocks requested, an average latency in processing storage requests, and a longest latency in processing storage requests.

6. The method of claim 5, wherein the plurality of monitored caching metrics are periodically reviewed by the processor and reset to start a collection process for collecting the plurality of monitored caching metrics.

7. The method of claim 1, wherein data associated with the storage request that is not to be cached at the cache memory is stored externally by the storage controller using the network connection.

8. A non-transitory machine-readable storage medium having stored thereon instructions for performing a method, comprising machine executable code which when executed by at least one machine, causes the machine to:
evaluate a storage request received by a computing device having a cache memory, the computing device communicating with a storage controller using a network connection, and the storage controller storing data for a plurality of applications at storage devices external to the computing device, wherein the storage request is evaluated by examining a characteristic of the storage request including a type of application originating the storage request and a pattern of related storage requests;

assign a priority to the storage request based on the characteristic of the storage request and an associated queuing policy, when data associated with the storage request is unavailable at the cache memory of the computing device for processing the storage request;

place the storage request at a queue from a plurality of queues of the cache memory based on the assigned priority of the storage request, wherein each of the plurality of queues has a corresponding priority and a quality of service setting indicating a latency goal for storage requests stored at the plurality of queues;

determine a caching policy associated with the storage request based on the characteristic, for identifying a caching priority for data associated with the storage request;

evaluate the plurality of queues and priority of other storage requests stored at the plurality of queues for selecting the storage request for processing;

transmit the storage request to the storage controller for processing;

process a response to the storage request from the storage controller based on the caching policy, wherein the response is cached at the cache memory based on the caching policy;

update a monitored caching metric from among a plurality of monitored caching metrics, based on the characteristic of the storage request and processing of the response to the storage request; and modify one of a plurality caching policies based on a confirmed purpose for a detected pattern involving a sequence of storage requests.

9. The non-transitory machine-readable storage medium of claim 8, the machine executable code further causing the machine to:
modify one of queuing policies based on the confirmed purpose.

10. The non-transitory machine-readable storage medium of claim 8, the machine executable code further causing the machine to:
process the storage request without having to use the plurality of queues, when data associated with the storage request is already available at the cache memory.

11. The non-transitory machine-readable storage medium of claim 8, wherein a purpose of the plurality of storage requests for the detected pattern is confirmed with an originator of the plurality of storage requests.

12. The non-transitory machine-readable storage medium of claim 8, wherein the plurality of monitored caching metrics include a number of storage requests of each type, a hit rate for the cache memory, an average size of data blocks requested, an average latency in processing storage requests, and a longest latency in processing storage requests.

13. The non-transitory machine-readable storage medium of claim 12, wherein the plurality of monitored caching metrics are periodically reviewed by the processor and reset to start a collection process for collecting the plurality of monitored caching metrics.

14. The non-transitory machine-readable storage medium of claim 8, wherein data associated with the storage request that is not to be cached at the cache memory is stored externally by the storage controller using the network connection.

15. A system, comprising:
a memory containing machine readable medium comprising machine executable code having stored thereon instructions, and a processor coupled to the memory to execute the machine executable code to:
evaluate a storage request received by a computing device having a cache memory, the computing device communicating with a storage controller using a network connection, and the storage controller storing data for a plurality of applications at storage devices external to the computing device, wherein the storage request is evaluated by examining a characteristic of the storage request including a type of application originating the storage request and a pattern of related storage requests;
assign a priority to the storage request based on the characteristic of the storage request and an associated queuing policy, when data associated with the storage request is unavailable at the cache memory of the computing device for processing the storage request;
place the storage request at a queue from a plurality of queues of the cache memory based on the assigned priority of the storage request, wherein each of the plurality of queues has a corresponding priority and a quality of service setting indicating a latency goal for storage requests stored at the plurality of queues;
determine a caching policy associated with the storage request based on the characteristic, for identifying a caching priority for data associated with the storage request;
evaluate the plurality of queues and priority of other storage requests stored at the plurality of queues for selecting the storage request for processing;
transmit the storage request to the storage controller for processing;
process a response to the storage request from the storage controller based on the caching policy, wherein the response is cached at the cache memory based on the caching policy;
update a monitored caching metric from among a plurality of monitored caching metrics, based on the characteristic of the storage request and processing of the response to the storage request; and
modify one of a plurality caching policies based on a confirmed purpose for a detected pattern involving a sequence of storage requests.

16. The system of claim 15, the machine executable code further executed to:
modify one of queuing policies based on the confirmed purpose.

17. The system of claim 15, the machine executable code further executed to:
process the storage request without having to use the plurality of queues, when data associated with the storage request is already available at the cache memory.

18. The system of claim 15, wherein a purpose of the plurality of storage requests for the detected pattern is confirmed with an originator of the plurality of storage requests.

19. The system of claim 15, wherein the plurality of monitored caching metrics include a number of storage requests of each type, a hit rate for the cache memory, an average size of data blocks requested, an average latency in processing storage requests, and a longest latency in processing storage requests.

20. The system of claim 19, wherein the plurality of monitored caching metrics are periodically reviewed by the processor and reset to start a collection process for collecting the plurality of monitored caching metrics.

* * * * *